US011183076B2

(12) United States Patent
Contractor et al.

(10) Patent No.: US 11,183,076 B2
(45) Date of Patent: Nov. 23, 2021

(54) COGNITIVE CONTENT MAPPING AND COLLATING

(71) Applicant: International Business Machines Corporation, Armonk, NY (US)

(72) Inventors: Danish Contractor, New Delhi (IN); Ying Li, Mohegan Lake, NY (US); Mukesh Mohania, Forrest (AU); Prasanna C. Nair, Bangalore (IN); Bikram Sengupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 15/947,156

(22) Filed: Apr. 6, 2018

(65) Prior Publication Data

US 2019/0311639 A1  Oct. 10, 2019

(51) Int. Cl.
  *G09B 5/06* (2006.01)
  *G06Q 10/10* (2012.01)
  *G06Q 10/06* (2012.01)

(52) U.S. Cl.
  CPC ......... *G09B 5/06* (2013.01); *G06Q 10/06395* (2013.01); *G06Q 10/105* (2013.01)

(58) Field of Classification Search
  CPC ... G09B 5/06; G06Q 10/105; G06Q 10/06395
  USPC ...................................................... 434/219
  See application file for complete search history.

(56) References Cited

U.S. PATENT DOCUMENTS

| 7,014,467 | B2 | 3/2006 | Krebs et al. |
| 7,029,280 | B2 | 4/2006 | Krebs et al. |
| 8,784,113 | B2 | 7/2014 | Bridges et al. |
| 9,684,657 | B2 | 6/2017 | Gambhir et al. |
| 2002/0188583 | A1 | 12/2002 | Rukavina et al. |
| 2005/0019739 | A1 | 1/2005 | Cunningham et al. |

FOREIGN PATENT DOCUMENTS

| WO | 2015128700 A1 | 9/2015 |
| WO | 2016093791 A1 | 6/2016 |

*Primary Examiner* — Robert P Bullington
(74) *Attorney, Agent, or Firm* — Ryan, Mason & Lewis, LLP

(57) ABSTRACT

Methods, systems, and computer program products for cognitive content mapping and collating are provided herein. A computer-implemented method includes identifying resources relevant to an existing course; partitioning, based on pre-determined partitioning parameters, (i) the existing course into multiple portions and (ii) the resources into multiple portions; detecting content coverage gaps in the existing course by semantically comparing (i) the multiple portions of the existing course with (ii) the multiple portions of the resources; retrieving, based on the detected content coverage gaps, at least one of the multiple portions of the resources; and generating an updated version of the existing course by incorporating the at least one retrieved portion of the resources into the existing course.

16 Claims, 8 Drawing Sheets

COGNITIVE CONTENT MAPPING AND COLLATING

FIELD

The present application generally relates to information technology, and, more particularly, to instructional information management.

BACKGROUND

Enterprise and workplace training has traditionally involved face-to-face sessions with instructors, using training materials that are generally text-based and related to one or more learning objectives of the organization. Increasingly, enterprises are attempting to phase-out such manual text-based approaches with electronic learning (e-learning) programs. However, instructional design teams in such enterprises generally have to manually review e-learning program content to determine the best matching course to replace an existing instructor-led training (ILT) course, as well as identify additional content that needs to be sourced and/or created to achieve coverage of a desired training course. Such a process is generally referred to (and is referred to herein) as mapping.

In such conventional approaches as noted above, the mapping process is both labor- and time-intensive. Moreover, the outcome of a conventional mapping process generally depends significantly on the experience and/or expertise of the instructional designer performing the mapping.

SUMMARY

In one embodiment of the present invention, techniques for cognitive content mapping and collating are provided. An exemplary computer-implemented method can include identifying one or more resources relevant to an existing course, and partitioning, based on one or more pre-determined partitioning parameters, (i) the existing course into multiple portions and (ii) the one or more resources into multiple portions. Such a method can also include detecting one or more content coverage gaps in the existing course by semantically comparing (i) the multiple portions of the existing course with (ii) the multiple portions of the one or more resources, and retrieving, based on the one or more detected content coverage gaps, at least one of the multiple portions of the one or more resources. One or more embodiments can also include using structured meta-data as part of this comparison process. Further, such an exemplary method as described herein can include generating an updated version of the existing course by incorporating the at least one retrieved portion of the one or more resources into the existing course.

In another embodiment of the invention, an exemplary computer-implemented method can include identifying one or more external resources relevant to an existing training course associated with a given enterprise, and partitioning, based on one or more pre-determined partitioning parameters, (i) the existing training course into multiple consumable modules and (ii) the one or more external resources into multiple consumable modules. Such a method can also include detecting one or more content coverage gaps in the existing training course by semantically comparing (i) the multiple consumable modules of the existing training course with (ii) the multiple consumable modules of the one or more external resources, and automatically creating one or more work items, wherein the one or more work items provide (i) instructions for generating an updated version of the existing training course based on incorporating at least one of the multiple consumable modules of the one or more external resources into the existing training course and (ii) an estimated effort associated with generating the updated version of the existing training course. Further, such a method can also include outputting the one or more created work items to one or more instructional designers associated with the given enterprise.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
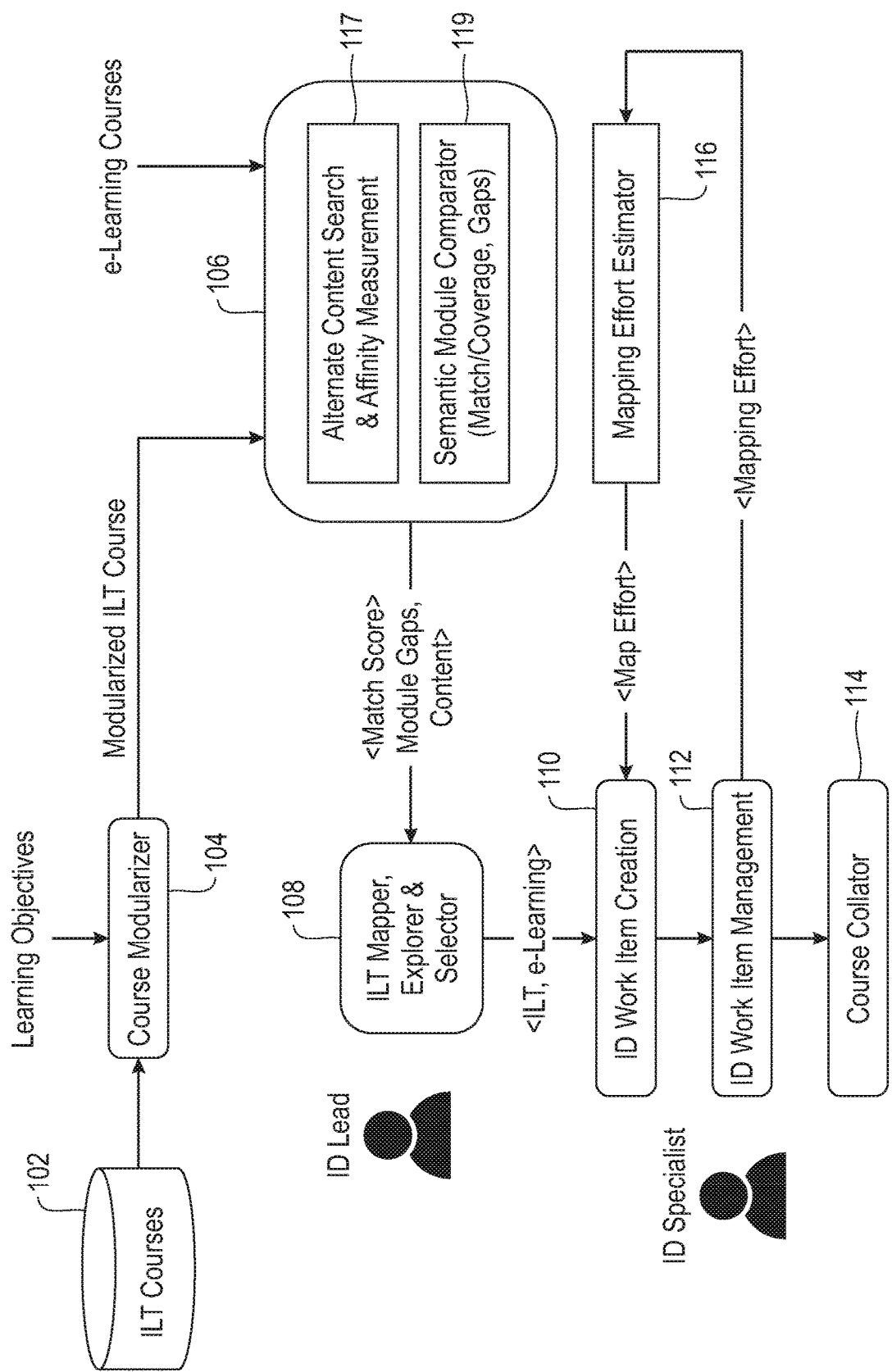
FIG. 1 is a diagram illustrating system architecture, according to an exemplary embodiment of the invention.

As described herein, an embodiment of the present invention includes cognitive content mapping and collating. At least one embodiment of the invention includes generating and implementing a cognitive system that suggests electronic learning (e-learning) courses and/or additional content in connection with one or more ILT courses and/or other existing courseware. Such an embodiment can include automatically analyzing ILT and e-learning course content and generating design guidance to effectively and efficiently map courseware.

Additionally, one or more embodiments of the invention include providing information to expedite content creation for instruction designers (IDs). Further, such an embodiment includes enabling IDs to identify and/or understand gaps in existing course content, as well as enabling the IDs to use existing resources to augment their existing courses and/or create new content. Such resources can include, for example, content such as blogs, articles, online videos, etc.

At least one embodiment of the invention includes determining whether an e-learning course provides sufficient coverage of particular topics and/or content in connection with an ILT course. Such an embodiment can include identifying other material that covers topics and/or content in an ILT course, and enabling automated creation of a new course covering a set of one or more learning objectives (or based on results from a user-specified search), using modules of an existing ILT or e-learning course. In using user-specified search results to create a new course, a user can, for example, select documents (chunks) that are of interest and request the generation of a new course based thereon. Such a request can include, for instance, a zip export, a generation into sharable content object reference model (SCORM) format, one or more learning formats that take multiple learning objects (files) and order them based on some criteria (which could also be further user input) or course curriculum guidelines, etc. Also, one or more embodiments of the invention can include implementing a framework for a user-driven creation of a course based on system-generated recommendations.

As also detailed herein, at least one embodiment of the invention includes automatically updating existing course content with available e-learning course content by mapping similarities between the existing course content and the available course content. Such an embodiment can additionally include identifying one or more gaps between ILT course content and available e-learning course content by mapping portions of e-learning course material with the ILT course content, and automatically creating work items to bridge the identified gaps by adding new and/or alternate content to the ILT course. Further, such an embodiment can include exporting the updated ILT course content, for example, into a standard courseware format, a SCORM format, a custom format, as a collection of documents in a zip file, etc.

One or more embodiments of the invention can include semantically portioning ILT courses into consumable modules based on learning objectives. Consumable modules can refer to learning objects that are smaller than large courses. For example, consumable objects can focus on a few (1-5, for instance) learning objectives instead of many dozens of learning objectives that large courses can often encompass. Such an embodiment can also include semantically comparing the ILT course modules with modules from e-learning courses to detect matches and coverage gaps in the ILT courses (leveraging multi-media analytics techniques). Via one or more multi-media analytics techniques, for example, images can be captioned, optical character recognition (OCR) can be performed so that more is known about the content presented, and such information could then be used in the overall matching, etc. Based on the identified gaps, such an embodiment can include retrieving alternate content that address the gaps (or parts thereof) and demonstrates overall affinity with the ILT course.

Additionally, work items can be automatically created for instructional design team members to bridge gaps using new and/or alternate content, and the effort required for making those changes can be estimated. By way of example, an effort estimation can be implemented as a regression model that uses features from previous course material and the course creation time (historical). Example features can include course topics, lexical and semantic features, topical analysis via external sources, learning objectives to be covered, presentation style, etc. One or more embodiments of the invention can also include ranking e-learning courses based on levels of matching and estimated mapping effort for an existing ILT course. Further, such an embodiment can include assisting an ID team to execute a set of mapping tasks, automatically generate the correct sequence of e-learning and additional modules, and updating the effort estimate models. The correct sequence can be based, for example, on course and/or learning goals/objectives. Course objectives, for example, are typically presented with a lesson plan.

One or more embodiments of the invention can include operating under one or more assumptions. Such assumptions can include, for example, that an ILT course includes a sequence of files in one or more formats such as .doc, .ppt, .pdf, etc. Such assumptions can also include that an e-learning course includes content in SCORM packages with individual files in formats of .doc, ppt, .pdf, etc., and also videos, simulations, animation, and/or other file types. Further, such assumptions can include that equivalent text (for example, a transcript) is available for all files in non-text format in an e-learning course (or can be provided by a pluggable module). It can also be assumed in one or more embodiments of the invention that ILT and e-learning parent courses have been chunked or partitioned into modules based on topic and length. For example, a primary topic in a parent course may be distributed over multiple modules after chunking, with linkages maintained between the modules. Additionally, each module can include parameters such as, for example, a maximum temporal parameter (for example, a maximum of N minutes in length (which can be determined automatically using heuristics, by aggregating average reading stats, etc.). Such assumptions can also include that partitioned chunks have been labeled and/or tagged with one or more learning objectives.

FIG. 1 is a diagram illustrating system architecture, according to an embodiment of the invention. By way of illustration, FIG. 1 depicts a course modularizer 104, which, based on one or more input learning objectives, modularizes an ILT course derived from an ILT course database 102. The modularized ILT course, in addition to one or more input e-learning courses, are provided to a search and comparison component 106. The search and comparison component 106 includes an alternate search and affinity measurement module 117, and a semantic module comparator 119 (which carries out matching functions, coverage discovery functions, and gap determination functions).

With respect to the semantic module comparator 119, a user can select an ILT course and query the semantic module comparator 119 to map the ILT course to one or more e-learning courses. The semantic module comparator 119 generates and returns a ranked list of candidate e-learning courses, with summary information on each match. The user can select a search result and navigate (for example, scroll through) a map that shows how the modules (chunks) of the ILT course map to modules of the e-learning course. For each module-level mapping, the semantic module comparator 119 can provide additional insights on gaps and possible actions, and assist the user in creating work-items to complete the mapping.

Additionally, at least one embodiment of the invention can include mapping, via the alternate content search and affinity measurement module 117, for example, learning objectives to e-learning courses. The user selects a learning objective (or a set of learning objectives) and queries module 117 to map the learning objective(s) to one or more e-learning courses. Module 117 generates and returns a ranked list of candidate e-learning courses, with summary information on each match. The user can select a search result and scroll through a map that shows how the modules (chunks) of the courses map to different learning objectives. For each mapping, module 117 can provide additional insights on gaps and possible actions, and assist the user in creating work-items to complete the mapping.

As illustrated, FIG. 1 also depicts an ILT mapper, explorer and selector component 108 (which can be associated with an ID team or lead operator), which receives inputs (such as match scores, module gaps, and content) from component 106. The ILT mapper, explorer and selector component generates an ILT-e-learning course(s) pairing as an output, which is then provided to an ID work item creation component 110. The pairing can be based on similarity, using the scores and the meta-data generated by module 117. The ID work item creation component 110 provides a work item to ID work item management component 112, which can be associated with an ID specialist. The ID work item management component 112 processes the work item and generates an output to a course collator 114. For example, for gaps identified, the ID work item management component 112 can route course creation requests to instruction designers based on their domain expertise, time availability (versus mapping effort computed), etc. The course collator 114 can view identified existing courses and/or related courses, gaps, etc., which a designer can then use to seed or create new content. Additionally, the ID work item management component 112 outputs a mapping effort to mapping effort estimator 116. The mapping effort generated by component 112 allows a user to identify a new gap and/or an improvement which he or she does not want to and/or cannot work on, and the mapping effort can then be used to map a new effort and be put into the queue as a new work item.

The mapping effort estimator 116 estimates the time required to generate new course content considering the gaps in the mapping. In at least one embodiment of the invention, the mapping effort estimator 116 can be implemented as a regression model that uses features from previous course material and the course creation time. Example features can include course topics, lexical and semantic features, topical analysis via external sources, learning objectives to be covered, presentation style, etc. The mapping effort estimator 116 instantiates a work flow for the ID to create new content, and the new content creation can be tracked and fed back to the system (via component 116) for improving mapping effort and/or content creation estimation.

Figure 2:
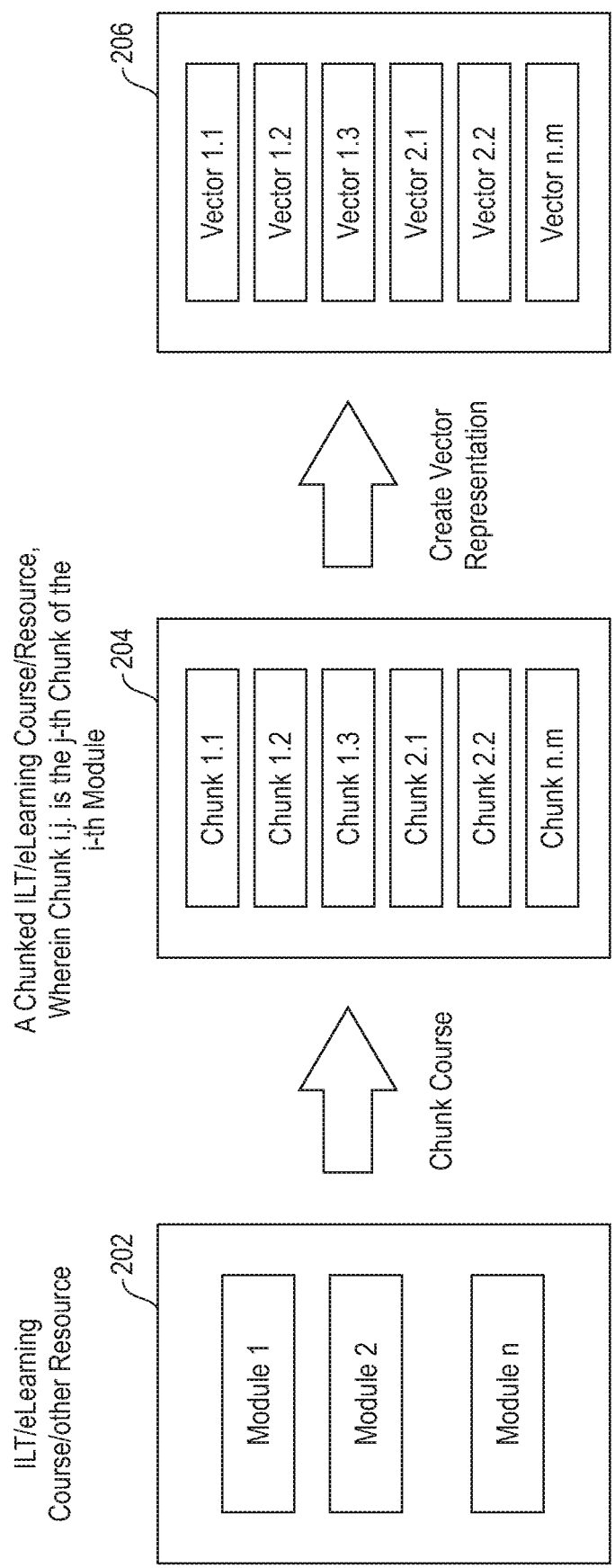
FIG. 2 is a diagram illustrating document representation, according to an exemplary embodiment of the invention.

FIG. 2 is a diagram illustrating document representation, according to an exemplary embodiment of the invention. By way of illustration, FIG. 2 depicts an ILT course, an e-learning course, and/or other resource 202, which has been modularized into multiple distinct modules. Based on the distinct modules, the ILT course, e-learning course, and/or other resource is partitioned into multiple chunks 204, wherein, for example, chunk i.j is the $j^{th}$ chunk of the $i^{th}$ module. Additionally, based on the partitioned chunks, a vector representation 206 of the ILT course, e-learning course, and/or other resource is created. Accordingly, in one or more embodiments of the invention, all documents and their chunks are represented as vectors. The vectors can be constructed using methods such as, for example, term frequency-inverse document frequency (tf-idf), and/or generating vectors via a neural network can provide a non-tf-idf based vector.

Figure 3:
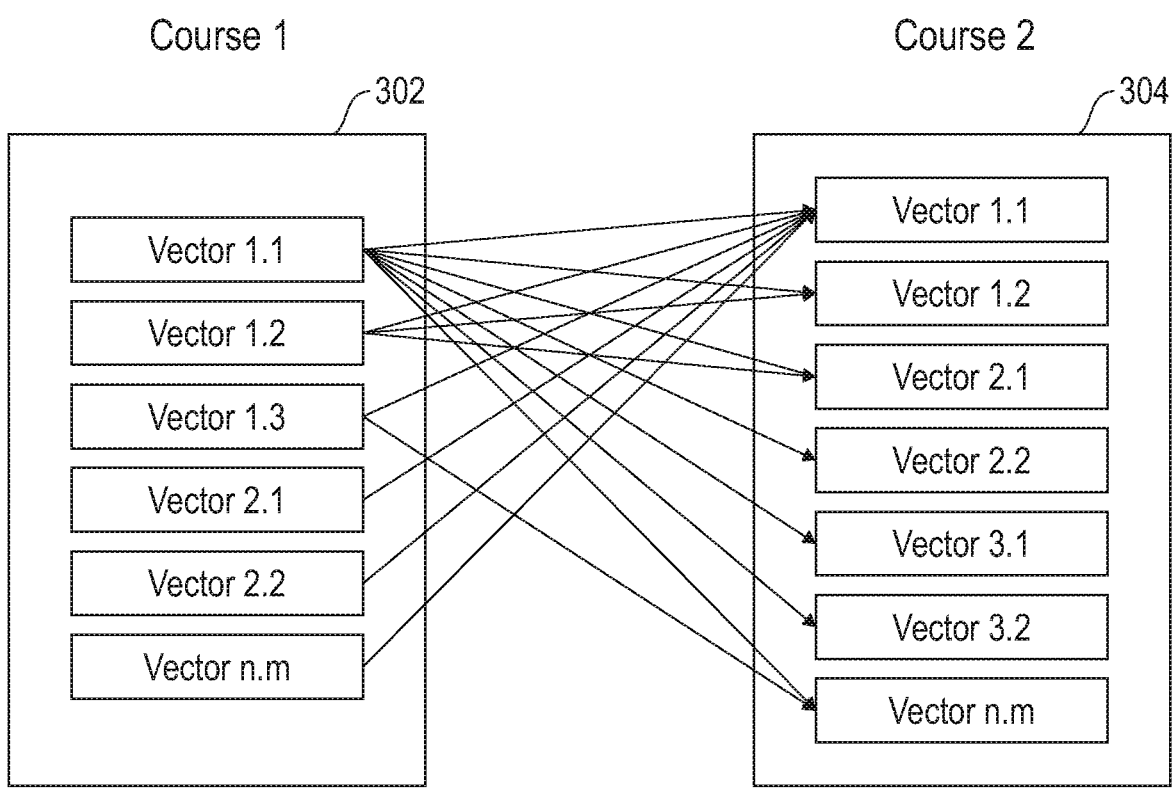
FIG. 3 is a diagram illustrating course similarity determinations, according to an exemplary embodiment of the invention.

FIG. 3 is a diagram illustrating course similarity determinations, according to an exemplary embodiment of the invention. By way of illustration, FIG. 3 depicts vectors of a first course 302 mapped to vectors of a second course 304. As noted above and herein, one or more embodiments of the invention include creating and utilizing vectors which correspond to chunks of courses or other external resources. In such an embodiment, all chunks retain logical meta-data linking them to their parent resources (documents, course and module). Document-level similarity can include, for example, cosine similarity, and scores can be binned for high, medium, and low classification.

At least one embodiment of the invention can include utilizing the edges between chunk vectors, wherein each edge denotes the cosine similarity score between the two vectors of the chunks. Such an embodiment can also include computing the maximum match in the bi-partite graph, and using weighted average of maximal edges, generating a combined similarity score (using a maximum match algorithm) between the two courses. As used herein, a maximal edge refers to an edge that participates in the maximum matching (based on a maximum matching algorithm).

Also, to enforce scores taking into account the relative ordering of courses, one or more embodiments of the invention can include using the following constraint for the maximum match: if $a\_i-b\_j$ ($i>j$) is selected as a maximal edge, then there can be no edge selected between $a\_(i+x)$ and $b\_(j-y)$, $x, y>0$ and $(i+x)<m$. As used above and herein, $a\_i$ represents any node on the left half of the bi-partite graph, $b\_j$ represents any node on the right half of the bi-partite graph, i and j represent indices, and x and y represent integers.

Figure 4:
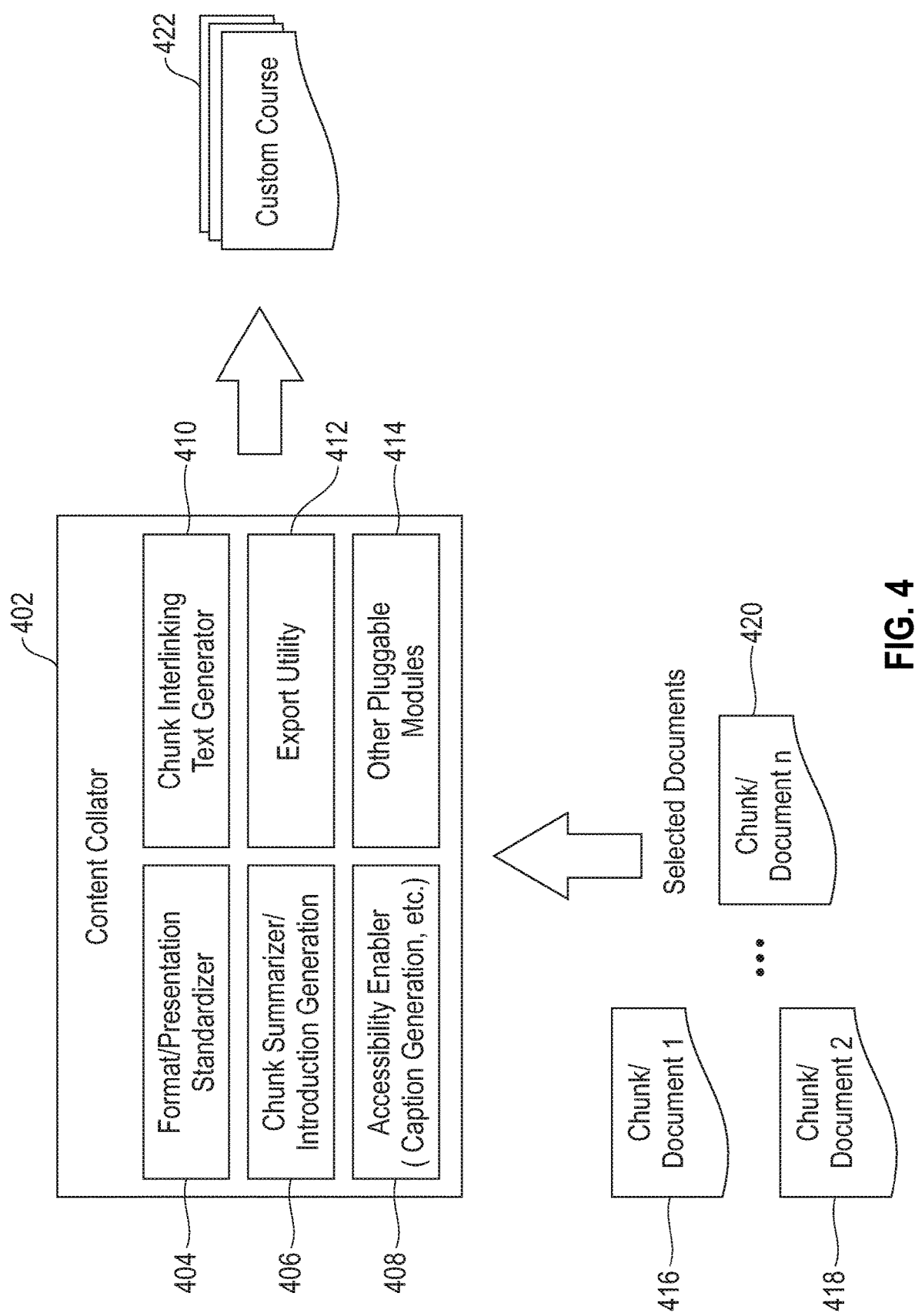
FIG. 4 is a diagram illustrating a content collator, according to an exemplary embodiment of the invention.

FIG. 4 is a diagram illustrating a content collator, according to an exemplary embodiment of the invention. By way of illustration, FIG. 4 depicts a content collator 402, which, based on inputs of one or more selected documents (such as a first chunk/document 416, a second chunk/document 418, an $n^{th}$ chunk/document 420), generates a custom course 422. As also illustrated in FIG. 4, the content collator 402 includes a format and/or presentation standardizer 404, a chunk summarizer and/or introduction generation component 406, an accessibility enabler 408 (for caption generation, etc.), a chunk interlinking text generator 410, an export utility component 412, and one or more other pluggable modules 414 (such as a user interface, for example).

The format and/or presentation standardizer 404 reformats documents for rendering and/or presentation consistency based on existing documents and/or input. The chunk summarizer and/or introduction generation component 406 and the chunk interlinking text generator 410 generate bridging text based on existing text. For example, one or more embodiments of the invention can include templatized text generation based on topics or neural methods for text generation that can be based on sequence-to-sequence architectures. The accessibility enabler 408 adds captions to images, videos, etc. The accessibility enabler 408 can implement one or more algorithms (such as, for example, OCR, image/video captioning based on speech and scene features, text-to-speech audio generation, etc.) to carry out its function(s). Additionally, the export utility component 412 generates a course in a zip, SCORM, or other required format (which can be customizable by the user).

In at least one embodiment of the invention, all documents (such as chunks/documents 416, 418 and 420) are tagged with one or more learning objectives and additional metadata. In such an embodiment, a user can select one or more documents (or chunks) that are of interest and can further request the generation of a new course 422 (based on the selected documents (chunks)). Recommendations for chunks/documents to be selected can also be considered using suggestions from a cognitive content laboratory (based on target audience, etc.). The content collator 402 reads the text of the selected chunks/documents, and standardizes the text based on a new format template (for example, via standardizer 404). Via accessibility enabler 408, any multimedia content in the selected chunks/documents can be automatically captioned, text colors can be enhanced, etc., for improving accessibility. The different chunks/documents can be linked together via the chunk interlinking text generator 410 by auto-generating bridge text. Additionally, the collated chunks/documents can be exported via export utility component 412 in standard course formats for use.

Figure 5:
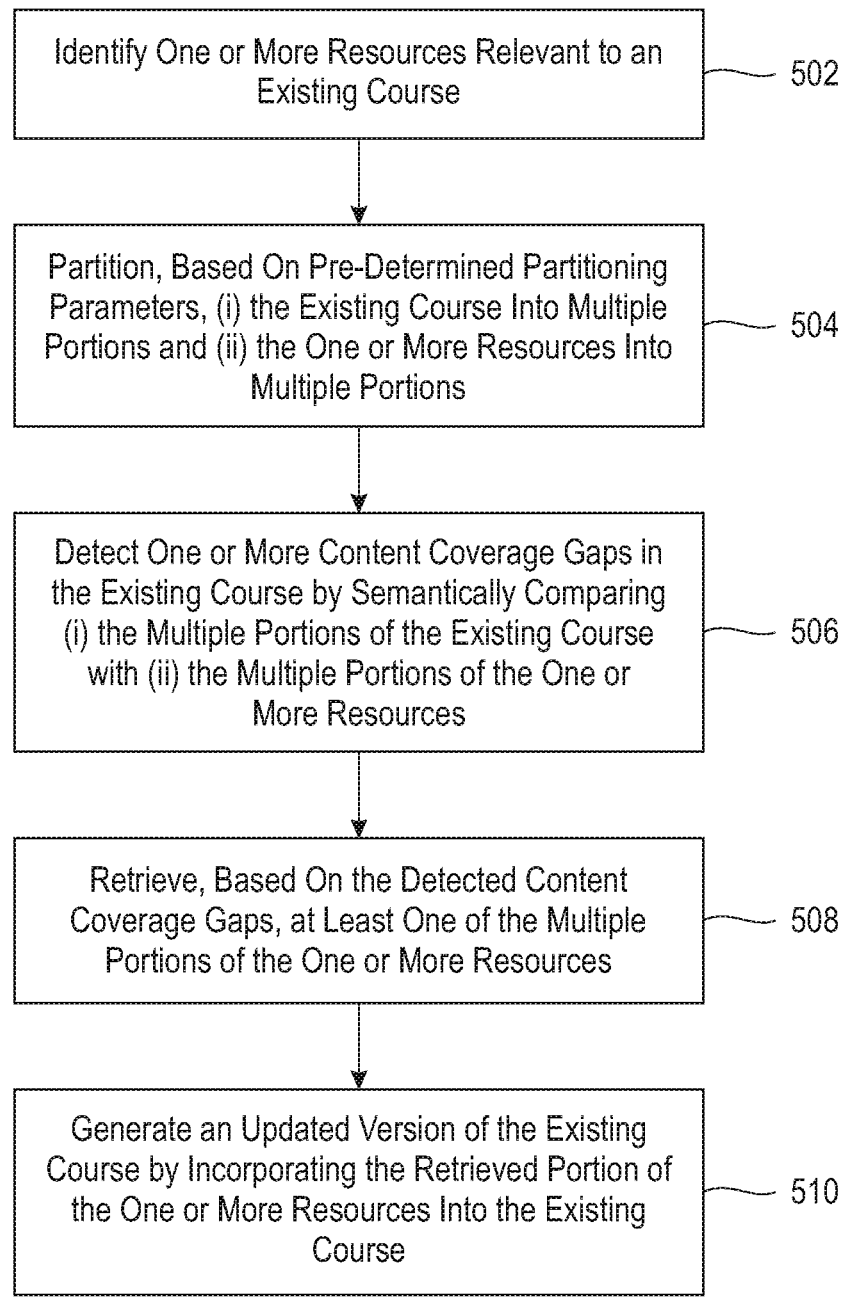
FIG. 5 is a flow diagram illustrating techniques according to an embodiment of the invention.

FIG. 5 is a flow diagram illustrating techniques according to an embodiment of the present invention. Step 502 includes identifying one or more resources relevant to an existing course. The existing course can include, for example, an ILT course, and the one or more resources can include, for example, one or more e-learning courses.

Step 504 includes partitioning, based on one or more pre-determined partitioning parameters, (i) the existing course into multiple portions and (ii) the one or more resources into multiple portions. Partitioning can include semantically partitioning (i) the existing course into multiple consumable portions and (ii) the one or more resources into multiple consumable portions. Additionally, the one or more pre-determined partitioning parameters can include one or more learning objectives, one or more keywords, etc.

Step 506 includes detecting one or more content coverage gaps in the existing course by semantically comparing (i) the multiple portions of the existing course with (ii) the multiple portions of the one or more resources. Detecting the one or more content coverage gaps in the existing course can include implementing one or more multimedia analytics techniques. Additionally, detecting the one or more content coverage gaps in the existing course can include mapping (i) the multiple portions of the existing course to (ii) the multiple portions of the one or more resources. Further, semantically comparing can include comparing (i) metadata associated with the multiple portions of the existing course with (ii) metadata associated with the multiple portions of the one or more resources.

Step 508 includes retrieving, based on the one or more detected content coverage gaps, at least one of the multiple portions of the one or more resources. At least one embodiment of the invention can also include determining affinity of the at least one retrieved portion of the one or more resources with the existing course.

Step 510 includes generating an updated version of the existing course by incorporating the at least one retrieved portion of the one or more resources into the existing course.

The techniques depicted in FIG. 5 can also include standardizing formatting of (i) the existing course and (ii) the one or more resources. Further, one or more embodiments of the invention can include generating, within the updated version of the existing course, one or more captions in connection with one or more items of multimedia content, as well as generating, within the updated version of the existing course, one or more items of bridge text linking two or more of multiple portions of the updated version of the existing course. Also, the techniques depicted in FIG. 5 can additionally include exporting the updated version of the existing course to one or more formats, wherein the one or more formats can include a standard courseware format, a sharable content object reference model, a custom format, and/or a collection of documents in a zip file.

Also, an additional embodiment of the invention includes identifying one or more external resources relevant to an existing training course associated with a given enterprise, and partitioning, based on one or more pre-determined partitioning parameters, (i) the existing training course into multiple consumable modules and (ii) the one or more external resources into multiple consumable modules. Such an embodiment can also include detecting one or more content coverage gaps in the existing training course by semantically comparing (i) the multiple consumable modules of the existing training course with (ii) the multiple consumable modules of the one or more external resources, and automatically creating one or more work items, wherein the one or more work items provide (i) instructions for generating an updated version of the existing training course based on incorporating at least one of the multiple consumable modules of the one or more external resources into the existing training course and (ii) an estimated effort associated with generating the updated version of the existing training course. Further, such an embodiment can also include outputting the one or more created work items to one or more instructional designers associated with the given enterprise.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
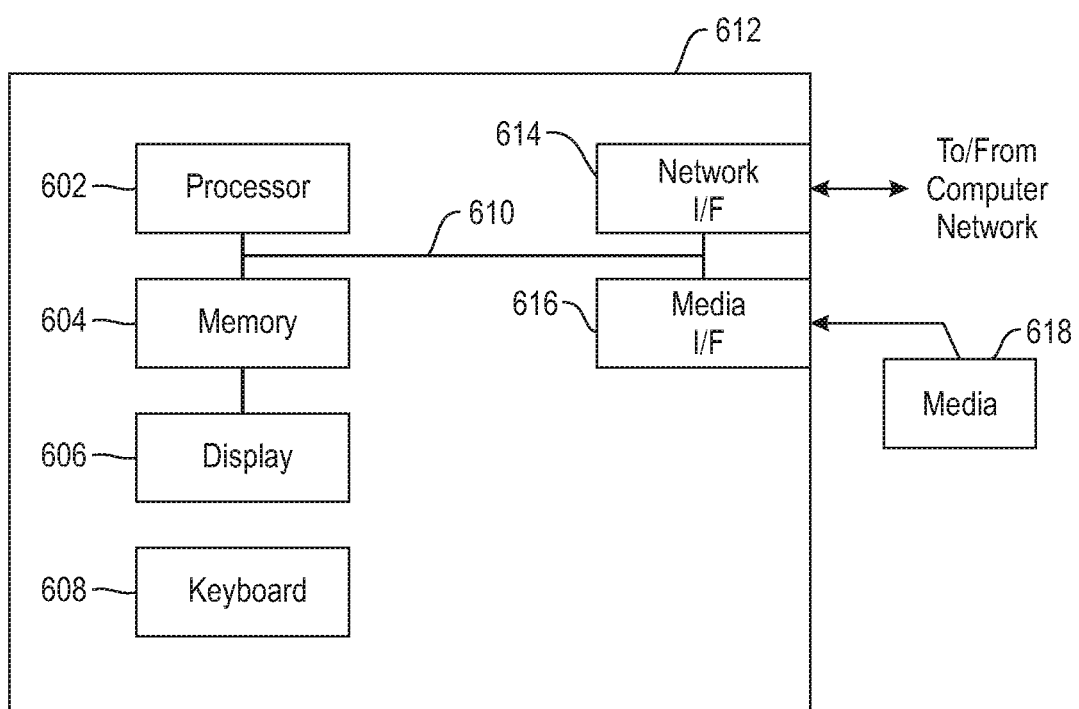
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit)

and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
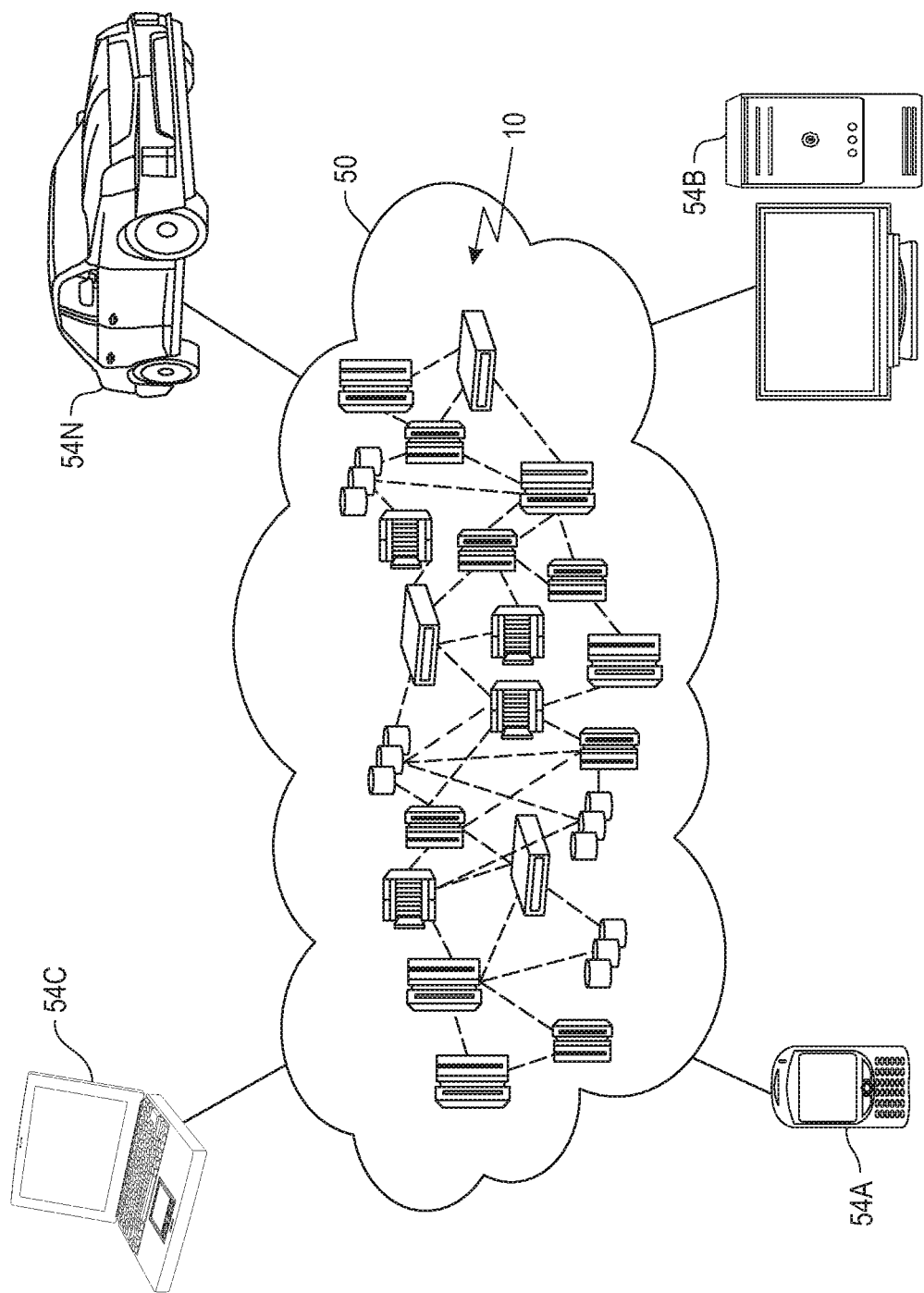
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
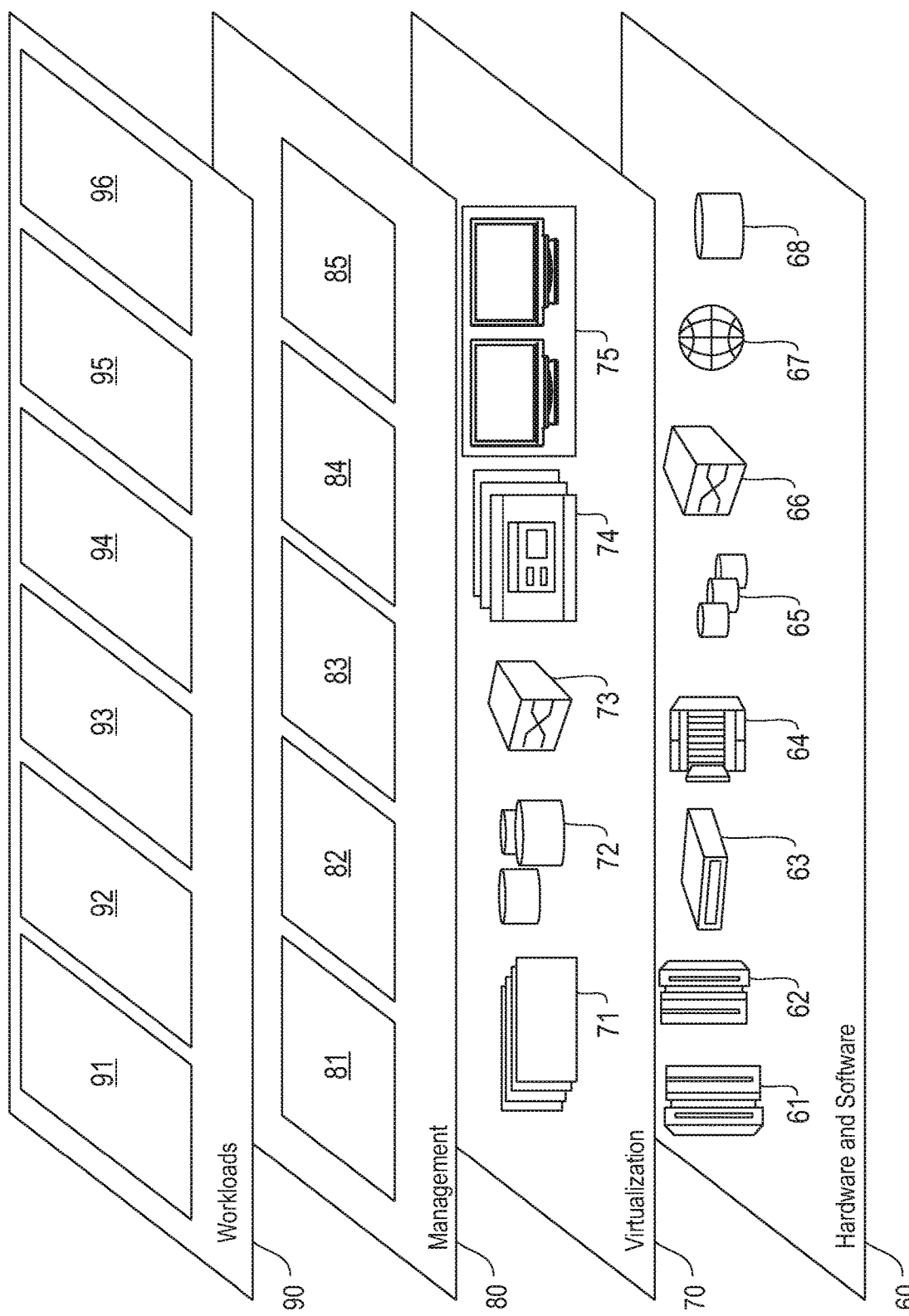
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive content mapping and collating 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, identifying gaps between ILT course content and e-learning course content, and automatically creating work-items to bridge the gaps by adding new and/or alternate content.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying one or more resources relevant to an existing course;
partitioning, based on one or more pre-determined partitioning parameters, the existing course into multiple portions and the one or more resources into multiple portions;
comparing at least portions of the multiple portions of the existing course with at least portions of the multiple portions of the one or more resources;
automatically estimating, using a regression model that incorporates features from previous course material and information pertaining course creation time, an amount of time required to generate an updated version of the existing course based at least in part on said comparing;
retrieving, based on said comparing and on the estimating amount of time, at least one of the multiple portions of the one or more resources;
generating an updated version of the existing course by incorporating the at least one retrieved portion of the one or more resources into the existing course;
exporting, to at least one device via one or more interfaces, the updated version of the existing course in at least one sharable content object reference model (SCORM) format; and
automatically updating the regression model for use in automatically estimating the amount of time required to generate an additional updated version of the existing course based at least in part on portions of the updated version of the existing course;
wherein the computer-implemented method is carried out by at least one computing device.

2. The computer-implemented method of claim 1, wherein said comparing comprises comparing metadata associated with the multiple portions of the existing course with metadata associated with the multiple portions of the one or more resources.

3. The computer-implemented method of claim 1, wherein the existing course comprises an instructor-led training course.

4. The computer-implemented method of claim 1, wherein the one or more resources comprise one or more electronic learning courses.

5. The computer-implemented method of claim 1, wherein said partitioning comprises semantically partitioning the existing course into multiple consumable portions and the one or more resources into multiple consumable portions.

6. The computer-implemented method of claim 1, wherein the one or more pre-determined partitioning parameters comprises one or more learning objectives.

7. The computer-implemented method of claim 1, wherein the one or more pre-determined partitioning parameters comprises one or more keywords.

8. The computer-implemented method of claim 1, wherein said comparing comprises implementing one or more multimedia analytics techniques.

9. The computer-implemented method of claim 1, wherein said comparing comprises mapping the multiple portions of the existing course to the multiple portions of the one or more resources.

10. The computer-implemented method of claim 1, comprising:
determining affinity of the at least one retrieved portion of the one or more resources with the existing course.

11. The computer-implemented method of claim 1, comprising:
standardizing formatting of the existing course and the one or more resources.

12. The computer-implemented method of claim 1, comprising:
generating, within the updated version of the existing course, one or more captions in connection with one or more items of multimedia content.

13. The computer-implemented method of claim 1, comprising:
generating, within the updated version of the existing course, one or more items of bridge text linking two or more of multiple portions of the updated version of the existing course.

14. A computer program product comprising a non-transitory computer readable storage medium having program instructions embodied therewith, the program instructions executable by a computing device to cause the computing device to:
identify one or more resources relevant to an existing course;
partition, based on one or more pre-determined partitioning parameters, the existing course into multiple portions and the one or more resources into multiple portions;
compare at least portions of the multiple portions of the existing course with at least portions of the multiple portions of the one or more resources;
automatically estimate, using a regression model that incorporates features from previous course material and information pertaining course creation time, an amount of time required to generate an updated version of the existing course based at least in part on said comparing;
retrieve, based on said comparing and on the estimating amount of time, at least one of the multiple portions of the one or more resources;
generate an updated version of the existing course by incorporating the at least one retrieved portion of the one or more resources into the existing course;
export, to at least one device via one or more interfaces, the updated version of the existing course in at least one sharable content object reference model (SCORM) format; and
automatically update the regression model for use in automatically estimating the amount of time required to generate an additional updated version of the existing course based at least in part on portions of the updated version of the existing course.

15. The computer program product of claim 14, wherein said comparing comprises mapping the multiple portions of the existing course to the multiple portions of the one or more resources.

16. A system comprising:
a memory; and
at least one processor operably coupled to the memory and configured for:
identifying one or more resources relevant to an existing course;

partitioning, based on one or more pre-determined partitioning parameters, the existing course into multiple portions and the one or more resources into multiple portions;

comparing at least portions of the multiple portions of the existing course with at least portions of the multiple portions of the one or more resources;

automatically estimating, using a regression model that incorporates features from previous course material and information pertaining course creation time, an amount of time required to generate an updated version of the existing course based at least in part on said comparing;

retrieving, based on said comparing and on the estimating amount of time, at least one of the multiple portions of the one or more resources;

generating an updated version of the existing course by incorporating the at least one retrieved portion of the one or more resources into the existing course;

exporting, to at least one device via one or more interfaces, the updated version of the existing course in at least one sharable content object reference model (SCORM) format; and automatically updating the regression model for use in automatically estimating the amount of time required to generate an additional updated version of the existing course based at least in part on portions of the updated version of the existing course.

* * * * *